United States Patent [19]

Baum

[11] Patent Number: 5,001,662

[45] Date of Patent: Mar. 19, 1991

[54] METHOD AND APPARATUS FOR MULTI-GAUGE COMPUTATION

[75] Inventor: Allen J. Baum, Palo Alto, Calif.

[73] Assignee: Apple Computer, Inc., Cupertino, Calif.

[21] Appl. No.: 345,116

[22] Filed: Apr. 28, 1989

[51] Int. Cl.[5] ............................................. G06F 7/52
[52] U.S. Cl. ................................................... 364/757
[58] Field of Search ............... 364/749, 754, 757, 759, 364/760, 745

[56] References Cited

U.S. PATENT DOCUMENTS

| | | | |
|---|---|---|---|
| 4,507,748 | 3/1985 | Cotton | 364/749 |
| 4,719,588 | 1/1988 | Tatemichi et al. | 364/754 |
| 4,761,755 | 8/1988 | Ardini, Jr. et al. | 364/749 |
| 4,825,401 | 4/1989 | Ikumi | 364/757 |
| 4,901,268 | 2/1990 | Judd | 364/745 |

FOREIGN PATENT DOCUMENTS

2095008 9/1982 United Kingdom ................ 364/754

OTHER PUBLICATIONS

Gooding et al., "Partial Byte Computations", *IBM Technical Disclosure Bulletin*, vol. 17, #7, pp. 1931-1932, Dec. 1974.

Chandra, "Matrix Multiplication on a Parallel Processing Machine", *IBM Technical Disclosure Bulletin*, vol. 19, #12 pp. 4830-4834, May 1977.

DeRose et al; "Near Optimal Speedup of Graphics Algorithms Using Multigauge Parallel Computers", Proc. of 1987 International Conf. on Parallel Processing, Aug. 17-21 1987, pp. 289-294.

*Primary Examiner*—Dale M. Shaw
*Attorney, Agent, or Firm*—Blakely, Sokoloff, Taylor & Zafman

[57] ABSTRACT

Methods and apparatus are provided for performing multi-gauge arithmetic operations in a microprocessor CPU. Special purpose instructions facilitate parallel processing of individual bytes or half words of data words without requiring that the processor's mode be separately controlled. A byte/half word mode flag is provided to control the "width" of narrow gauge operation. Add partial, substract partial and compare partial instructions operate on corresponding bytes or half words of two operands and return independent byte or half word results. Multiply partial instructions multiply byte or half word multiplicands by a common multiplier and return independent byte or half word products. The multi-gauge arithmetic operations of the present invention have particular application to graphics processing where repetitive operations are performed on large arrays of pixel data.

16 Claims, 3 Drawing Sheets

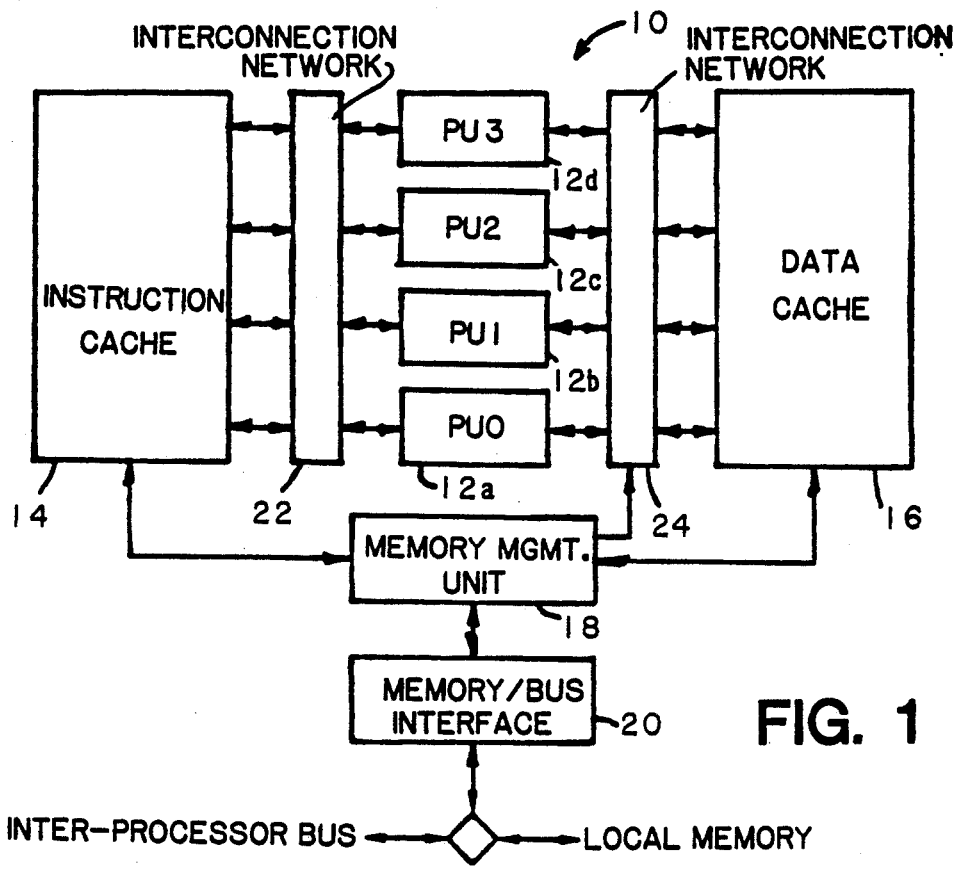
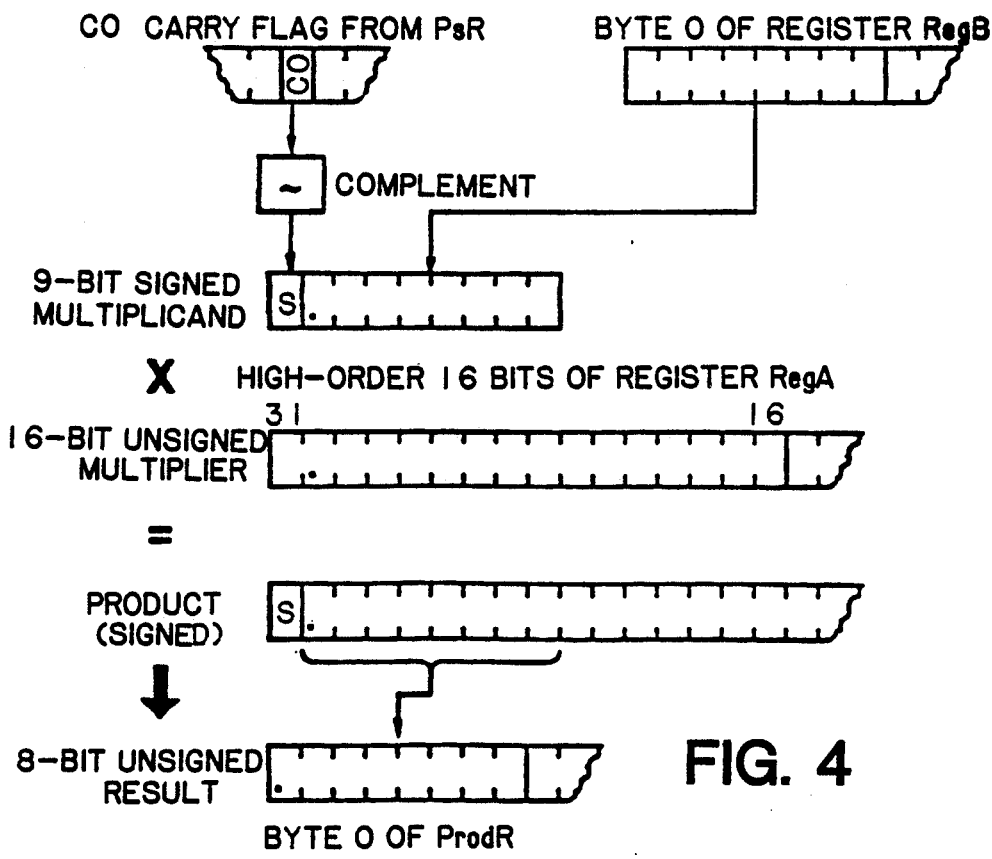
FIG. 1
FIG. 4

METHOD AND APPARATUS FOR MULTI-GAUGE COMPUTATION

BACKGROUND OF THE INVENTION

1. Field of the Invention

This invention relates to the field of data processing. More particularly, it relates to a method and apparatus for accelerating computational processing in a central processing unit (CPU).

2. Background Art

Advances in the design of microprocessors have led to new generations of personal computer systems with ever higher performance capabilities. In particular, personal computers are now capable of performing sophisticated graphics processing. Many graphics processing algorithms are characterized by the need to perform repetitive operations on large quantities of pixel data. Such algorithms may be efficiently implemented by processing multiple data streams in parallel. For example, pixel data generally comprises color intensity data for the three primary colors: red, green and blue, and may also comprise one or more additional attributes. Pixel operations can thus be accelerated by processing each of the colors in parallel.

It is known that parallel processing can be implemented by splitting a computer's data path into a number of independent data paths that execute operations on "small" data concurrently. Such splitting of a data path is referred to as multi-gauging or multi-gauge processing. Applications of multi-gauge processing to accelerate graphics algorithms have been described by T.D. DeRose et al. in "Near-Optimal Speedup of Graphics Algorithms Using Multigauge Parallel Computers," Proceedings of the 1987 International Conference on Parallel Processing, August 17-21, 1987, pp. 289-294. In this article, the authors describe dividing a 32-bit microprocessor into k independent processing units such that each unit operates on its own data stream in a narrow gauge mode. The memory bus is also split into k units in order to provide the narrow gauge machines with their own data streams. The entire processor is thus configured to operate in either the broad gauge or narrow gauge mode. Although it is suggested that mode changes can be accomplished by augmenting the instruction stream with "fork" and "join" instructions, such an approach adds additional processing overhead.

A more efficient approach, as embodied in the present invention, is to provide a set of special purpose arithmetic instructions that effect narrow gauge operations. Such instructions are analogous to their broad gauge counterparts but operate independently on subsets of the full data words. Using this approach, broad gauge and narrow gauge arithmetic operations can be freely interleaved within a program without incurring additional overhead to switch the operating mode of the processor.

SUMMARY OF THE INVENTION

The present invention provides methods and apparatus for performing multi-gauge arithmetic operations in a microprocessor CPU. Special purpose instructions are provided that facilitate parallel processing of individual bytes or half words of data words. A byte/half word mode flag is provided to control the "width" of narrow gauge operation. Add Partial, Subtract Partial and Compare Partial instructions operate on corresponding bytes or half words of two operands and return independent byte or half word results. Multiply Partial instructions multiply byte or half word multiplicands by a common multiplier and return independent byte or half word products. Carry condition codes are independently maintained for each half word or byte. A Load Carry Partial instruction sign extends the carry condition codes into their full respective half words or bytes.

The multi-gauge arithmetic operations of the present invention have particular application to graphics processing where repetitive operations are performed on large arrays of pixel data. In particular, the partial multiply instructions are advantageously applied to linear interpolation of pixel color intensities and anti-aliasing such that the individual primary color intensities can be processed in parallel in a single instruction cycle.

BRIEF DESCRIPTION OF THE DRAWINGS

FIG. 1 is a functional block diagram of a central processing unit (CPU) suitable for implementing the present invention.

FIG. 4 is an operational flow diagram illustrating a partial multiply instruction according to the present invention.

NOTATION AND NOMENCLATURE

Figure 2:
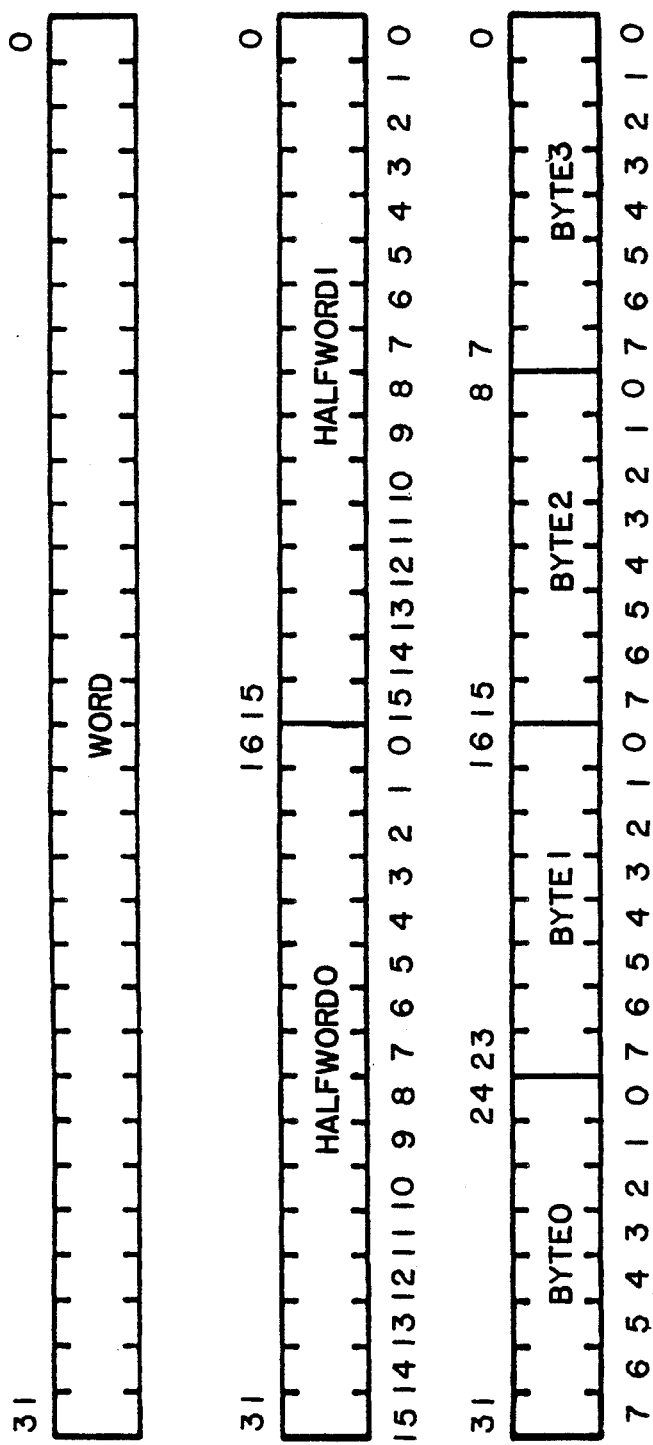
FIG. 2 illustrates the bit and byte structure of data words in the CPU of FIG. 1.

The detailed description which follows is presented largely in terms of algorithms and symbolic representations of operations on data bits within a computational device. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities. Further, the manipulations performed are also referred to in terms, such as adding or comparing, which are commonly associated with mental operations performed by a human operator. No such capability of a human operator is necessary, or desirable in most cases, in any of the operations described herein which form part of the present invention; the operations are machine operations. While the present invention is most advantageously applied in a microprocessor, other useful machines for performing the operations of the present invention may include general purpose digital computers and similar devices. In all cases, the distinction between the method operations and operating a computer and the method of computation itself should be noted. The present invention relates, in part, to method steps for operating the processor and thereby process electrical signals to generate other desired electrical signals.

DETAILED DESCRIPTION OF THE INVENTION

In the following description, for purposes of explanation and not limitation, specific data representations, bit assignments, sequences of operation, etc. are set forth in order to provide a thorough understanding of the present invention. However, it will be apparent to one skilled in the art that the present invention may be practiced in other embodiments that depart from these specific details. In other instances, detailed descriptions of well known data processing devices, techniques and algorithms are omitted so as not to obscure the description of the present invention with unnecessary detail.

The present invention is advantageously applied in a tightly-coupled multiprocessor CPU that provides efficient support for fine-grained parallelism. The CPU architecture is preferably designed to take advantage of the inter-connectivity of single-chip VLSI implementations. Such a CPU may be employed as the processing element of a high-performance personal computer system constructed with a minimal number of components. In order to provide a thorough understanding of the present invention, an overview of a CPU in which the invention is preferably embodied will first be presented.

CPU Overview

Referring to FIG. 1, a CPU indicated generally as 10 comprises four independent processing units (PUs) 12a–d which share access to an instruction cache 14, a data cache 16, a Memory Management Unit (MMU) 18, and a Memory/Bus Interface 20. In addition to communicating through memory, PUs 12a–d can communicate and can coordinate their activities via broadcast instructions, which permit one PU to send data and addresses simultaneously to other PUs and to suspend its execution until other PUs complete execution of their activities. Multiple CPUs can be connected via an Interprocessor Bus to form a multiprocessor system in which each CPU has its own local memory which it can share with other CPUs.

Each of the four identical and independent PUs 12a–d of CPU 10 is a 32-bit RISC (Reduced Instruction Set Computer). The four PUs access the instruction and data caches via interconnection networks 22 and 24. In addition to providing PU cache data transfer paths, these networks provide a direct inter-PU communication path for broadcast operations and global register access, as well as a path for interrupt routing. Instruction and data caches are divided into four banks, and each interconnection network includes a 5×4 crossbar switch, permitting simultaneous instruction and data accesses by all four PUs.

When CPU 10 receives a message interrupt or an external interrupt (such as an I/O interrupt), it examines the status of its four PUs. If one of the PUs is halted, it is assigned to process the interrupt. Only if all four PUs are busy is it necessary to actually interrupt PU execution. Interrupt processing, then, frequently can be done in parallel with application execution. Each PU has a flag which indicates if its state must be saved on interrupt. If a PU sets this flag prior to halting, state saving overhead on interrupt processing can be eliminated.

The PUs have a small register-oriented instruction set in which all data access to memory is done by register load and store instructions. Register and word size is 32 bits. Each PU 12a–d has 16 general-purpose registers, a total of 64 for CPU 10, and 7 local registers. Local registers include product, remainder, prefix, and various state saving registers. In addition, the four PUs share 8 global registers, including interrupt, event counter, and global status registers.

All instructions are 16 bits in length. There ar two address modes: register, and base plus displacement. Base plus displacement addressing provides a displacement of up to 64 words from the base register address. However, prefixing can be used to increase the displacement range, transform register addressing into base plus displacement addressing (with any register as base), and provide signed displacements.

The 16-bit instruction length limits the size of immediate and displacement fields in the instructions. However, a large proportion of immediate and displacement values encountered in programs are small enough to be contained in these fields. When necessary, larger values can be created by prefixing the immediate or displacement field value. Each PU has a local register called the Prefix Register, whose state (empty or not empty) is represented by a Prefix Valid flag. Values are loaded into the Prefix Register by a Prefix instruction. If the Prefix Register is empty when a Prefix instruction is executed, the immediate field of the Prefix instruction is stored in the low-order bits of the Prefix Register and sign extended, and the Prefix Valid flag is set to not empty. If a second Prefix instruction is then executed, the contents of the Prefix Register are shifted left and the immediate field of the second Prefix instruction is stored in the low-order bits of the Prefix Register. When an instruction with a prefixable immediate or displacement is executed, the Prefix Valid flag is examined. If the Prefix Register is not empty, the contents of the Prefix Register are concatenated with the instruction's immediate or displacement field to form the effective immediate or displacement value. Prefixing also is used to define fields for field manipulation instructions.

The elements and organization of CPU 10 can be better understood in terms of a programming model comprising the elements of the CPU which are visible to a programmer (i.e., can be operated on by instructions). These elements include general registers, status register and program counter, special registers, and the instruction and data caches.

Various instructions operate on 32-bit full words, 16-bit half words, 8-bit bytes, and individual bits. Instructions themselves always are a half word in length. Only words and bytes can be directly loaded into a register from memory or stored to memory from a register. Arithmetic operations can be performed on words, half words, and bytes. As illustrated in FIG. 2, the 32 bits of a word are numbered right to left, from 0 to 31. Bit 0, the rightmost bit, is the least significant bit. Higher-numbered bits often are referred to as the high-order bits, and lower-numbered bits often are referred to as the low-order bits.

Half words and bytes within a word are positioned as shown in FIG. 2, which also shows bit ordering within half words and bytes. Byte 0 is the most significant (leftmost) byte, while byte 3 is the least significant (rightmost) byte.

In general, instructions and data are transferred between memory and CPU 10 in 64-byte (16-word) blocks called lines, which are stored in the instruction cache or data cache. The term "line" or "cache line" is used to refer to both a physical location in a cache and a block of 16 memory words which can be stored in that location. Instruction and data caches are architecturally visible, and instructions are provided to perform operations on cache lines including prefetch, invalidate, and flush.

Instruction and data addresses are byte addresses, 32 bits in length, spanning a virtual address space of 4096 megabytes. While all addresses are byte addresses, memory accesses for instructions and data are constrained to the appropriate boundaries. A half word boundary is a byte address with bit $<0>=$"0", a word boundary is a byte address with bits $<1:0>=$"00", and a line boundary is a byte address with bits $<5:0>=$"000000". Instructions always must be aligned on a half word boundary; the low-order bit of an instruction address is ignored. Word operands always must be aligned on word boundaries; the low-order two bits of the operand address of a load or store word instruction are ignored. Cache lines, by definition, are aligned on cache line boundaries. Line transfers between the CPU and memory always are done on line boundaries. The low-order six bits of the operand address of a cache control instruction are ignored.

The programming model comprises a general register set, status register and program counters, a special register set, and the instruction and data caches. Each PU has its own general register set, status register, and program counters; these registers are said to be local to the PU. Each PU also has its own copy of certain special registers, while other special registers are common to all PUs; these are called global registers.

PUs execute in one of two modes; user mode or system mode. The current operating mode of a PU is determined by the setting of a flag in the PU Status/Control Register. Generally, applications execute in user mode, while the operating system kernel and other parts of the operating system execute in system mode. Execution in system mode confers certain privileges. Some special registers can be accessed only in system mode, certain instructions can be executed only in system mode, and pages marked "system only" can be accessed only in system mode.

Each PU has 16 32-bit general registers, numbered 0-15, so that there are 64 general registers for the CPU as a whole. General registers are generally interchangeable; any register can be used for any purpose. Any individual general register can be loaded from memory or have its contents stored to memory. From 1 to 15 registers can be loaded from memory or have their contents stored to memory via Load/Store Multiple instructions. A Load Byte instruction loads the addressed byte, right-justified with zero fill, into a general register. A Store Byte instruction stores the rightmost byte of a general register to memory.

There are two program counters (PCs), called the Current PC and the Next PC. Current PC holds the address of the currently-executing instruction. Next PC holds the address of the next instruction to be executed. Two program counters are required because of delayed branching. On a taken branch or jump, Current PC holds the address of the branch shadow instruction, and the branch target address is stored in Next PC. For sequential code, the address in Next PC usually is equal to the address in Current PC plus 2. Instructions must start on half word boundaries, so program counter bit $<0>$ always is "0".

The contents of Current PC can be read by executing a Load Program Counter instruction, which loads the address in the Current PC, plus 2, into a general register. In addition to the normal incrementing which takes place in execution of sequential code, program counters are modified when a taken branch or jump instruction is executed, or when a return from interrupt takes place. When an interrupt or a trap is recognized by an interrupt/trap enabled PU, the contents of the Current and Next PCs are saved in a special register pair called the PC Save Queue; on return from interrupt, the contents of the PC Save Queue are transferred to Current PC and Next PC.

Multi-guage operations

The PU Status and Control Register (PsR) contains flags which control PU execution modes, enable or disable generation of certain traps and recognition of interrupts, and record information about the state of the PU and about the results of arithmetic operations. One bit of the PU Status/Control Register (PsR) is reserved for a half word/byte (H/B) mode flag. When this flag is set to a logical one, it specifies that multi-gauge arithmetic instructions are to operate on half words (16 bits). When set to a logical zero, the flag specifies that multi-gauge arithmetic instructions are to operate on 8-bit bytes. Although the H/B mode flag is stored as a bit of the PsR in the preferred embodiment of the present invention, it is to be understood that such a flag may be implemented in other registers or as a bit in the instruction code itself.

As in prior art processors, the processing units of the present invention provide the traditional four condition codes, namely, Negative (N), Zero (Z), Overflow (V), and Carry (C). However, the PsR of the present invention provides for four carry condition codes, C0, C1, C2 and C3, which are set or cleared in various combinations to reflect the results of full word, half word or byte operations. When a full word operation results in a carry, C0 is set to "1" and C1, C2, and C3 are cleared to "0". In half word mode C0 and C2 are set to the carry from the corresponding half word (i.e. "1" if there is a carry, "0" if there is no carry), while C1 and C3 cleared to "0". In byte mode, C0, C1, C2, C3 are set to the carry from the corresponding byte.

For addition, the appropriate carry condition code C is determined from $$C=(A\&B)|(A|B)\&\sim R$$

where:
A is the sign of the addend,
B is the sign of the augend,
R is the sign of the result,
"&" denotes the AND operation,
"|" denotes the OR operation, and
"$\sim$" denotes the NOT, or 1's complement, operation.
Thus, C is set if both addend and augend are negative or if either is negative and the sum is positive.

For subtraction and comparison, the carry condition code C is determined from $$C=((\sim A)|(((\sim A)|B)\&\sim R)$$

where:
A is the sign of the minuend,
B is the sign of the subtrahend, and
R is the sign of the result.
C is set if the minuend is positive and the subtrahend is negative. Also, C is set if the result is positive and either the minuend is positive or the subtrahend is negative.

Whenever carry condition codes are tested, all four bits C0–C3 are ORed together such that if any one of the bits has been set, a carry condition will be detected. By testing the carry condition codes in this manner, the test is independent of the operating "gauge" at the time the condition code bits were set and/or reset. Thus the testing instruction, such as a conditional branch, may always be coded the same regardless of whether the instruction sequence preceding it contains full word, half word or byte arithmetic instructions.

The Zero condition code of the present invention is also implemented differently than in prior art processors. For full word arithmetic operations, Z is set to "1" if the result is zero, as in the prior art. However, for half word or byte arithmetic operations, Z is set to "1" if either half word or any of the four bytes is zero. Thus, in narrow gauge operations, Z may be set even though all 32 bits of the result word are not "0".

Figure 3:
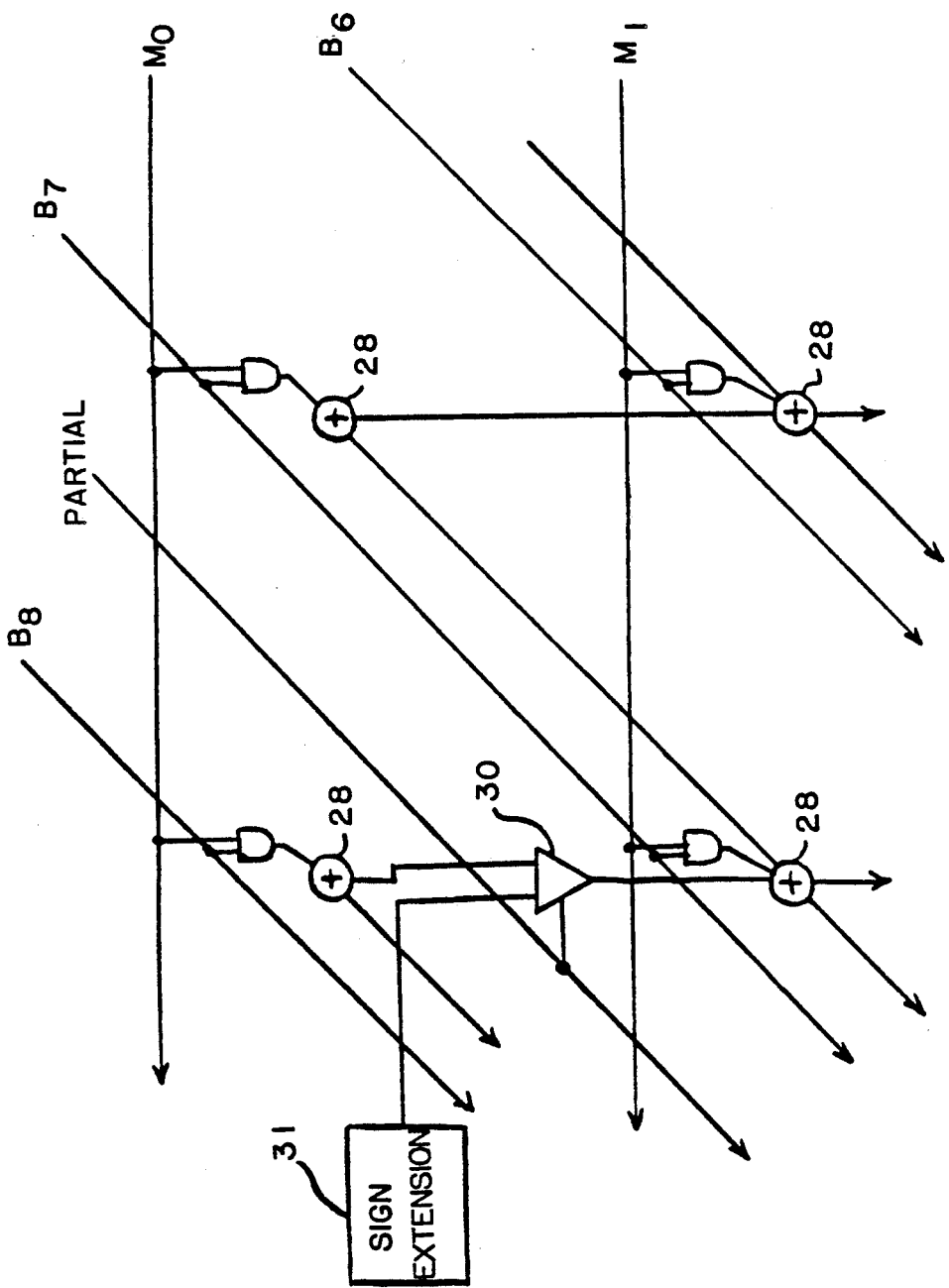
FIG. 3 is a logic schematic diagram of a portion of a multiplier according to the present invention.

Referring now to FIG. 3, an important architectural aspect of the present invention will be described. Each PU includes a 32-bit multiplier that is partitionable into two independent 16-bit (half word) or four independent 8-bit (byte) multipliers. FIG. 3 illustrates a portion of the multiplier at the boundary between two bytes, specifically, between bit $B_7$, the most significant bit of byte 3, and bit $B_8$, the least significant bit of byte 2. The multiplier is implemented using an array of adders 28 as is well known in the art. However, a multiplexer 30 is added to the input of each full adder which has the uppermost bit of a byte (i.e., bits 7, 15, 23 and 31) as an input. The selection input to multiplexer 30 is a control signal PARTIAL indicating whether or not a partial multiply is to be performed. One of the data inputs to multiplexer 30 is the sum contribution from the low order bit of the previous byte which would otherwise be applied directly to adder 28. The other data input is provided by the sign extension logic 31 for the byte. Such sign extension logic may be implemented in any one of the many ways that are well known in the art. It is important, however, that each byte have associated therewith its own independent sign extension logic which preferably replicates the sign extension logic of the full word multiplier.

When the partial mode is enabled, the sign extension logic 31 is supplied a "0" for an unsigned partial multiply instruction (described below) and is supplied the inverse of the appropriate carry condition code for a signed partial multiply instruction (also described below). Thus, when the partial mode is enabled, the appropriate sign extension is applied at the output of multiplexer 30 and the sum contribution from the low order bit of the previous byte is turned off, thereby preventing carry propagation across the partial word boundary. Separate multiplexer selection signals are provided for each of the three inter-byte boundaries so that either byte or half word operation may be selected in accordance with the H/B mode flag.

When operating in one of the partial word modes, the multiplier returns invalid data in the low order bits which ordinarily contain the 32 least significant bits of the product. However, the upper 32-bits that are left in the Product Register contain the desired results, namely the most significant portions of two or four partial word products.

The present invention provides a set of special purpose instructions for performing arithmetic operations on register bytes or half words, as determined by the state of the H/B mode flag in the status register PsR. In the following descriptions, these instructions are described in terms of operations on registers "A" and/or "B". In this nomenclature, "A" and "B" refer to specified ones of the PU's 16 general registers. It is to be understood that the described arithmetic operations are performed on the contents of the designated registers, i.e. the binary numbers represented by the bit states of the registers. The contents of the designated registers are also referred to as the operands of the instructions.

Multiply Partial Signed

Referring now to FIG. 4, the Multiply Partial instruction forms a signed multiplicand from each of the four bytes or two half words (as determined by the H/B mode flag) in register B, using the complement of the carry condition code flag for that byte or half word as its sign. FIG. 4 illustrates multiplication of byte 0 when the byte mode is selected.

Multiplication of bytes 1–3, or of half words 0 and 1 in the half word mode, is performed similarly.

If the H/B mode flag is clear, each byte of register B is multiplied times register A, with carries between bytes inhibited. If the H/B mode flag is set, each half word of register B is multiplied times register A, with carries between half words inhibited. Each byte or half word is independently multiplied. The results are stored in the respective bytes or half words of the product register.

Only the high order 16 bits of register A (bits 31–16) are used as the multiplier. The low order 16 bits of register A are ignored. The multiplier is represented as an unsigned, left-justified fractional quantity.

Each byte or half word of the multiplicand is a signed, two's complement, left justified, fractional quantity. The sign of each multiplicand is determined by the inverse of the corresponding carry bit in the status register PsR. In byte mode, all four carry bits C0–C3 are used. In the half word mode, only C0 and C2 are used. If the corresponding carry bit contains a zero, the multiplicand is negative. If the carry bit contains a one, the multiplicand is positive.

Each result byte or half word is an unsigned fractional quantity formed by discarding the sign of the product and storing as the result the most significant byte or half word of the product. The result bytes or half words are concatenated and stored in the product register. The low order byte or half word of each product is ignored.

Multiply Partial Unsigned

This instruction is substantially the same as Multiply Partial except that the multiplicands are unsigned quantities. The carry bits of the status register are ignored. As explained above, the sign bit for each multiplicand is "0" and each multiplicand byte or half word is an unsigned, left-justified fractional quantity. As in the (signed) Multiply Partial instruction, the multiplier is an unsigned, left-justified, fractional quantity.

Load Carry Partial

This instruction sign extends the carry condition codes of the status register according to the mode specified by the H/B mode flag and stores the result in register A. In byte mode, each byte's carry code, C0, C1, C2, and C3, is sign extended into 8 bits. In half word mode, each half word carry code, C0 and C2, is sign extended into 16 bits. The resulting bytes or half words are concatenated and stored in their respective bytes or half words of register A.

The load carry partial instruction is particularly useful for performing addition or subtraction with saturation on overflow or underflow, respectively. In the case of addition, the sequence of instructions comprising Add Partial, followed by Load Carry Partial, followed by a logical OR causes each byte or half word having an overflow sum to be filled with "1". Conversely, in the case of subtraction, the sequence of instructions comprising Subtract Partial, followed by Load Carry Partial, followed by a logical AND causes each byte of half word having an underflow difference to be filled with "0"s.

Add/Subtract Partial

These instructions arithmetically cOmbine the four bytes or the two half words (as determined by the H/B mode flag) in register A with the corresponding bytes or half words in register B. The arithmetic results, B+A or B−A, are returned to the respective bytes or half words of the B register. Carries between bytes or half words are inhibited so that each byte or half word pair is individually added or subtracted. Carry ins are forced to "0" in the Add Partial instruction and are forced to "1" in the Subtract Partial instruction. However, the carry outs of each byte or half word are preserved in the respective carry bits of the status register.

In the byte mode, C0-C3 are individually set if the corresponding byte has a carry out and each bit for which there is no carry is cleared. In the case of subtraction, this results in the carry bits being set if the corresponding unsigned register B byte is greater than or equal to the corresponding register A byte. In the half word mode, C0 and/or C2 is set if the corresponding half word has a carry out and is cleared if there is no carry for the corresponding half word. C1 and C3 are always cleared in the half word mode.

The Z condition code is set to "1" if the result of any byte or halfword addition or subtraction, as the case may be, is zero. Otherwise, Z is cleared to "0".

Compare Partial

This instruction is identical to Subtract Partial except that the arithmetic result is not stored; only the condition codes are stored. Compare Partial compares the contents of the bytes or half words (as determined by the H/B mode flag) in register B with the corresponding bytes or half words in register A. The carry in to each byte or half word is forced to "1" such that each byte or half word is treated as an independent operand. The carry and zero condition code bits of the status register are set according to the true arithmetic result of the corresponding byte or half word subtraction of register A from register B.

As with Subtract Partial, in the byte mode C0, C1, C2 and/or C3 is set if the corresponding unsigned register B byte is greater than or equal to the corresponding register A byte. Otherwise the condition code bit is cleared. In the half word mode, C0 and/or C2 is set if the corresponding register B half word is greater than or equal to the corresponding register A half word. Otherwise the bit is cleared. C1 and C3 are always cleared in the half word mode. If the result of any of the byte or half word comparisons is zero, i.e., if any pair of the respective bytes or half words are equal, the Z condition code is set to "1". Otherwise, Z is cleared to "1".

Graphics Applications

It should be observed that the Partial Multiply instructions of the present invention are particularly useful for performing parallel linear interpolation of multiple data sets, such as pixel color intensity values.

Linear interpolation between a starting value S and an ending value E as a function of a parameter t may be represented by the following:

$$(E*t)+(S*(1-t))$$

This smoothly and linearly interpolates between the end values S and E as t varies from 0 to 1.

In an alternative expression of the above function, t may have a value between 0 and T, in which case the interpolated value at a point t is given by:

$$(E*(t/T))+(S*(1-(t/T)))$$

This can be rewritten as:

$$S+(E-S)*(t/T)$$

In the particular case where t is constrained to assume only integer values between 0 and T, it can be seen that successive interpolated values may be obtained by computing (E−S)/T and successively adding this quantity to the previous interpolated value. This is the technique frequently employed in the prior art. However, this technique is subject to rounding errors since the quantity (E−S)/T is obviously small in comparison to either of the end values S or E when T is large. Thus, a rounding error in computing (E−S)T will be greatly magnified when t=T and the terminal value E either may not be achieved or may be overshot.

Greater precision can be achieved by successively incrementing the quantity (t/T) with the quantity (1/T) and then multiplying by the quantity (E−S). This technique has the disadvantage of requiring a multiplication for each interpolated value. In the case of color shading for graphics applications, where each pixel is represented by three independent color intensities, interpolation by this latter technique requires three multiplications per pixel. In the absence of multi-gauge processing as afforded by the present invention, this can result in an undesirable or unacceptable processing burden. For example, since it is advantageous to pack pixel color intensity data into single data words, independent multiplication of each color in a prior art processor involves a substantial overhead of data packing and unpacking. Thus, it will be recognized that one aspect of the present invention provides a means for performing multiple independent multiplications in parallel such that accurate linear interpolation of pixel color intensities may be substantially accelerated.

The Multiply Partial instructions of the present invention are also particularly useful for anti-aliasing at the edge of a rendered surface. In this application, where an individual pixel contains portions of two or more surfaces, a composite color intensity for such a pixel is easily computed by multiplying the color intensities of each surface times the relative percentage that each surface is present within the pixel and combining the results. In prior art systems, such a computation would require a minimum of six independent multiplications to calculate the three primary color intensities of the pixel or would require iterative incremental additions of the respective color intensities.

By way of further disclosure of the present invention, set forth below is "C" language code that implements the functions of the Multiply Partial (signed) instruction ("MulP") and the Multiply Partial Unsigned instruction ("MulPU"). The following code is intended as a means for simulating certain of the operations performed by the present invention and should not be construed as defining the invention itself. Moreover, the following code, by defining the logical relationships that are implemented within electronic circuits of a processor according to the present invention, is useful for creating a physical embodiment thereof by applying circuit development techniques that are well known in the art.

In the following nomenclature, B and A are the inputs, 'hb' is the half word/byte mode flag(hb=0 if byte, hb=1 if half word) and cin 0. . . 3 are the four carry inputs.

```
#defiine lo       0x0000ffff
#define hi        0xffff0000
#defiine b0msk    0xff000000
#define b1msk     0x00ff0000
#define b2msk     0x0000ff00
#define b3msk     0x000000ff
unsigned int MulPartial(A,B,hb,cin0,cin1,cin2,cin3)
unsigned int A,B;
int hb,cin0,cin1,cin2,cin3;
{
unsigned int au,bu,al,bl;
  au = A >> 16;al = A & lo;
  bu = B >> 16;bl = B & lo;
if (hb = 0) {
  return (((( ((bl & 0xff)*au)-(!cin3?(au<<8):0))&b1msk)>>16) |
           ((( ((bl >> 8)*au)-(!cin2?(au<<8):0))&b1msk)>> 8) |
           ((( ((bu & 0xff)*au)-(!cin1?(au<<8):0))&b1msk) ) |
           ((( ((bu >> 8 )*au)-(!cin0?(au<<8):0))&b1msk)<< 8) );
} else {
  return (((      (bl * au)-(!cin2?(au<<16):0))>>16)+
          ((      (bu * au)-(!cin0?(au<<16):0)) & hi));
}}
unsigned int MulPartialUnsigned(A,B,hb)
unsigned int A,B;
int hb;
{
unsigned int au,bu,al,bl;
  au = A >> 16;al = A & lo;
  bu = B >> 16;bl = B & lo;
if (hb = 0) {
  return (((((bl & 0xff)*au)&b1msk)>>16) |
          ((((bl >> 8)*au)&b1msk)>> 8) |
          ((((bu & 0xff)*au)&b1msk)    ) |
          ((((bu >> 8 )*au)&b1msk)<< 8) );
} else {
  return ( ((bl * au)>>16)    |    ((bu * au) & hi)  );
}}
```

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. In a digital computer, a method for selectively performing a plurality of arithmetic operations in parallel comprising the steps of:

(a) providing a multiplying means for performing an M-bit multiplication and which is selectively partitioned into a plurality of independent sub-multiplying means, each such sub-multiplying means for performing an N-bit multiplication where M and N are integers, with M being greater than N;

(b) providing a plurality of independent sign extension logic means individually associated with said plurality of independent sub-multiplying means;

(c) selectively enabling said plurality of independent sign extension logic means when said multiplying means is partitioned into said plurality of independent sub-multiplying means;

(d) providing a first register means for storing a multiplier;

(e) providing a second register means for storing an M-bit word representing a plurality of N-bit multiplicands;

(f) asserting said plurality of N-bit multiplicands at said multiplying means;

(g) asserting said multiplier at said multiplying means;

(h) computing a plurality of independent products of said respective plurality of multiplicands and said multiplier;

(i) truncating each of said plurality of independent products to an N-bit result; and (j) concatenating said plurality of N-bit results into an M-bit word.

2. The method of claim 1 wherein M=32.

3. The method of claim 2 wherein N=8.

4. The method of claim 2 wherein N=16.

5. The method of claim 1 further comprising the step of asserting a plurality of respective sign bits at said multiplying means for each of said plurality of multiplicands.

6. The method of claim 5 further comprising the step of providing a status register for storing said plurality of sign bits prior to the assertion thereof at said multiplying means.

7. The method of claim 5 further comprising the step, before the step of asserting said plurality of sign bits at said multiplying means, of determining each of said plurality of sign bits as a result of a respective arithmetic operation.

8. The method of claim 7 wherein said result is a carry condition of said respective arithmetic operation.

9. The method of claim 8 wherein said arithmetic operation is addition.

10. The method of claim 8 wherein said arithmetic operation is subtraction.

11. The method of claim 8 wherein said arithmetic operation is comparison.

12. In a digital computer, a method for selectively performing a plurality of arithmetic operations in parallel comprising the steps of:

(a) providing a multiplying means for performing an M-bit multiplication and which is selectively partitioned into a plurality of independent sub-multiplying means, each said sub-multiplying means for performing an N-bit multiplication where M and N are integers, with M being greater than N.

(b) providing a first register means for storing a multiplier;

(c) providing a second register means for storing an M-bit word representing a plurality of N-bit multiplicands;

(d) asserting said plurality of N-bit multiplicands at said multiplying means;

(e) asserting said multiplier at said multiplying means;

(f) determining a respective sign bit for each of said plurality of multiplicands as a result of a respective arithmetic operation;

(g) asserting said plurality of respective sign bits at said multiplying means for each of said plurality of multiplicands;

(h) computing a plurality of independent products of said respective plurality of multiplicands and said multiplier;

(i) truncating each of said plurality of independent products to an N-bit result; and (j) concatenating said plurality of N-bit results into an M-bit word.

13. The method of claim 12 wherein said result is a carry condition of said respective arithmetic operation.

14. The method of claim 13 wherein said arithmetic operation is addition.

15. The method of claim 13 wherein said arithmetic operation is subtraction.

16. The method of claim 13 wherein said arithmetic operation is comparison.

* * * * *